United States Patent [19]
Hendrick

[11] Patent Number: 5,063,954
[45] Date of Patent: Nov. 12, 1991

[54] MULTIPLE ORIFICE VALVE WITH REDUCED OPERATOR TORQUE

[75] Inventor: Fred W. Hendrick, Cerritos, Calif.

[73] Assignee: Automatic Control Components, Boulder, Colo.

[21] Appl. No.: 539,229

[22] Filed: Jun. 18, 1990

Related U.S. Application Data

[63] Continuation-in-part of Ser. No. 417,064, Oct. 4, 1989, abandoned.

[51] Int. Cl.$^5$ .................. F16K 3/08; F16K 11/074
[52] U.S. Cl. .................... 137/625.31; 251/208; 251/118
[58] Field of Search .................. 137/625.31; 251/208, 251/118

[56] References Cited

U.S. PATENT DOCUMENTS

| | | | |
|---|---|---|---|
| 3,026,899 | 3/1962 | Mischanski | 137/625.31 X |
| 3,207,181 | 9/1965 | Willis | 137/625.31 |
| 4,098,294 | 7/1978 | Woods | 137/625.31 X |
| 4,603,834 | 8/1986 | Hendrick . | |
| 4,901,977 | 2/1990 | Hendrick . | |

*Primary Examiner*—Arnold Rosenthal
*Attorney, Agent, or Firm*—Clifford A. Poff

[57] ABSTRACT

To reduce the torque required to turn a movable upstream disk relative to an abutting stationary downstream disk in a multiple orifice valve, particularly when the disks are subjected to high fluid pressures, there is provided a removable sleeve or insert at the outlet side of the stationary downstream disk having a support member formed therein for supporting the downstream or outlet side of the downstream disk. The support member may be provided with a central raised portion for supporting the downstream side of the stationary downstream disk along the central axis thereof which is coaxial with the central rotational axis of the movable upstream disk. The supportive sleeve or insert serves to reduce the torque required to turn the upstream disk irrespective of the diameter of the disks. Such a sleeve further reduces the required turning torque in such valve assemblies wherein the abutting faces of the disks are polished to a high level of surface finish quality. In yet a further embodiment, the instrument for reducing the torque required to turn the upstream disk relative to the downstream disk includes the provision, on at least one of the abutting faces of the disks, of a relatively raised central region and a relatively recessed peripheral region whereby frictional contact between the abutting faces is localized essentially at the central regions thereof.

26 Claims, 7 Drawing Sheets

MULTIPLE ORIFICE VALVE WITH REDUCED OPERATOR TORQUE

The present invention is a continuation-in-part of U.S. patent application Ser. No. 417,064, filed Oct. 4, 1989, now abandoned.

BACKGROUND OF THE INVENTION

1. Field of the Invention

The present invention relates to a valve having relatively movable disk members each with a fluid opening which can be brought into and out of fluid conducting alignment for discharging fluid to a discharge port, and, more particularly, to improvements to such a valve which include means for centrally supporting the disk members in order to reduce the torque required to turn a first of the disk members relative to a second of the disk members at such times when the disk members are subjected to high fluid pressures.

2. Description of the Prior Art

This invention relates to a valve of the type having a stationary disk and a rotatable disk mounted in a valve housing in a face-to-face confronting relationship in a pathway for fluid in a valve body. The disks are each provided with at least one orifice or opening which controls the flow of fluid through the valve by the size of the openings in the disk as well as the degree of alignment between the openings in the disk. Angular movement of one disk relative to the other in the valve body is accomplished by moving or turning a handle situated outside of the valve body but coupled to produce rotation of the rotatable disk. The rotatable disk can be moved from a full open position wherein the opening or openings in one disk completely align with the opening or openings in the other disk for providing maximum flow through the valve to a fully closed position wherein the opening or openings in the respective disks are completely misaligned and blocked by solid portions of the confronting disks. Examples of valves which operate in this fashion are disclosed in U.S. Pat. No. 3,207,181, and in my prior U.S. Pat. Nos. 4,901,977 and 5,054,521 as well as my copending U.S. patent applications Ser. Nos. 450,549 and 264,855 now U.S. Pat. No. 5,025,833 the disclosures of which are incorporated herein by reference.

Valves of this type are particularly useful for controlling the flow of fluids from oil and gas wells and the like. Such a valve is sometimes called a choke when used to control the rate of flow of well production fluids that may contain abrasive containments such as sand particles. The fluid entering the valve may be under extreme pressure on the order of, for example, 3000 PSI. The openings in the disks are of a smaller cross-sectional area than either an upstream entry chamber or a downstream discharge chamber that are formed in a valve body. The openings in the disks cause an acceleration of the fluid passing through the openings in the disk. Therefore, the fluid emerging from the opening in the downstream disk enters at an increased velocity a discharge chamber which has a cross-sectional area that is greater than the cross-sectional area of the openings in the disk, but because of the construction of the discharge chamber, particularly when provided with a replaceable protective sleeve or insert in the valve body, a large pressure drop in the fluid passing through the sleeve is created. The effect is to reduce the capacity of the valve, and, because of the construction of the removable sleeve, abrupt changes to the configuration of the opening in the sleeve produce turbulence in the fluid, particularly at the outlet of the valve which is unprotected by the removable sleeve.

In the known form of valves of the type under discussion such as disclosed in my U.S. Pat. No. 4,603,834, the outlet is defined by an oblong transverse configuration immediately downstream of the downstream disk. The oblong configuration is a result of the need to provide openings to receive retainer pins which are used to anchor the disk in the valve body. At times when a protective sleeve is required for the outlet chamber, the area of the oblong configuration is reduced by the thickness of the sleeve. The reduced oblong area of the outlet, in turn, limits the maximum size of the disk that can be use with the removable sleeve as compared with, for example, the size of the oblong outlet chamber when a removable sleeve is not used. The smaller volume for conducting fluid in the sleeve creates a larger pressure drop to the fluid passing through the sleeve, thus reducing the capacity of the valve.

Moreover, in the known form of valves using replaceable sleeves at the outlet chamber, the sleeve is adhered to the valve body by an adhesive, such as epoxy cement, which also is relied upon to prevent the flow of fluid between the sleeve and the valve body. When it is necessary to replace the sleeve, the valve body must be heated to a temperature sufficient to soften the epoxy so that the sleeve can be removed. Typically, it is known to heat a valve body to over 250 degrees Fahrenheit in order to effectively soften the epoxy for replacement of the sleeve.

An inherent and historic disadvantage of such multiple orifice valves is that when the disks are subject to extreme fluid pressures, the torque required to angularly move one disk relative to the other may sometimes be enormous. This problem is further compounded if the contacting faces of the stationary disk and the movable disk are polished or machined to a high level of surface finish quality. Moreover, at any given pressure, the torque required to turn one disk relative to the other is even further increased as the diameter of the disks increases.

An advantage exists, therefore, for a multiple orifice valve construction which requires relatively low torque in order to turn the movable disk relative to the stationary disk when the disks are subject to extreme fluid pressures. Such a construction should permit the aforesaid low turning torque regardless of the smoothness of the contacting faces of the disks and the diameter of the disks. Furthermore, such a construction should be equally advantageously used in the manufacture of new valves as well as in retrofitting existing valve assemblies.

It is therefore an object of the present invention to provide a multiple orifice valve construction including a stationary disk and an abutting movable disk wherein relatively low torque is required to angularly move the movable disk relative to the stationary disk even at such instances when the disks are subject to extreme fluid pressures.

It is a further object of the present invention to provide an multiple orifice valve construction wherein relatively low torque is required to turn the movable disk relative to the stationary disk even at such instances when the abutting faces of the disks are polished to an extremely high surface finish quality or smoothness.

It is a further object of the present invention to provide an multiple orifice valve construction wherein relatively low torque is required to turn the movable disk relative to the stationary disk regardless of the diameters of the disks.

It is a further object of the present invention to provide a improved construction of a sleeve member forming a discharge flow path for fluid emerging from the passageway in a disk member within a valve body to carry a seal to prevent flow of fluid about the outer periphery of the disk members as well as between the sleeve and support surfaces therefore in the valve body.

It is a further object of the present invention to provide a multiple orifice valve construction which is a advantageously used in the manufacture of new valves as well as in retrofitting existing valve assemblies.

Still other objects and advantages will become apparent in light of the attached drawings and written description of the invention presented hereinbelow.

SUMMARY OF THE INVENTION

To reduce the torque required to turn a movable upstream disk relative to an abutting stationary downstream disk in a multiple orifice valve, particularly when the disks are subjected to high fluid pressures, there is provided in a first embodiment of the invention a removable tubular sleeve or insert member at the outlet side of the stationary downstream disk having a support member formed therein for supporting the downstream or outlet side of the downstream disk. In a further embodiment, the support member is provided with a central raised portion for supporting the downstream side of the stationary downstream disk along the central axis thereof which is coaxial with the central rotational axis of the movable upstream disk. The supportive sleeve or insert member serves to reduce the torque required to turn the upstream disk irrespective of the diameter of the disks. Such a sleeve further reduces the required turning torque in such valve assemblies wherein the abutting faces of the disks are polished to a high level of surface finish quality. In yet a further embodiment, the instrument for reducing the torque required to turn the upstream disk relative to the downstream disk includes the provision, on at least one of the abutting faces of the disks, of a relatively raised central region and a relatively recessed peripheral region whereby frictional contact between the abutting faces is localized essentially at the central regions thereof.

DESCRIPTION OF THE PREFERRED EMBODIMENTS

Figure 1:
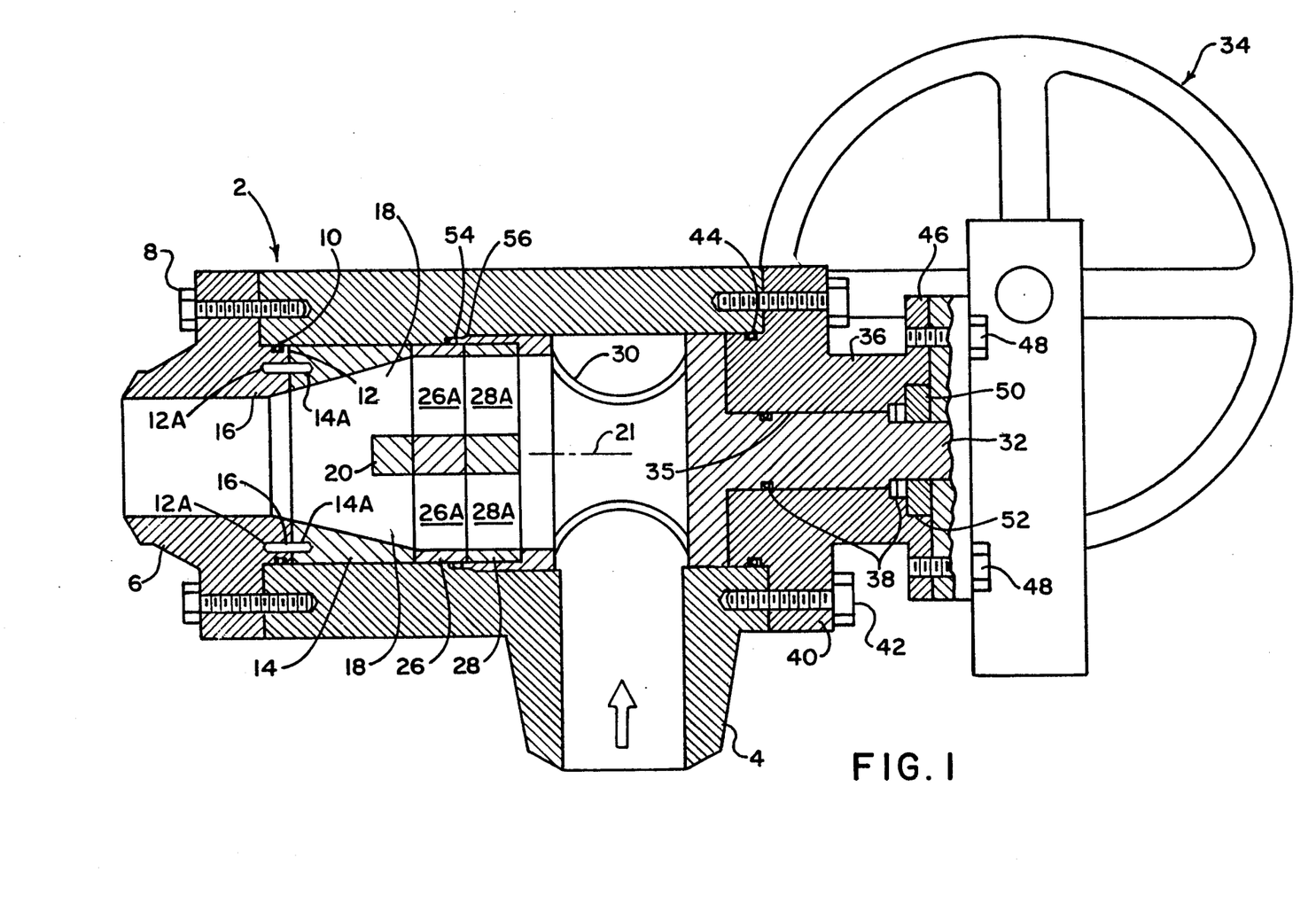
FIG. 1 is a side view, partially in section, of a first type of multiple orifice disk-operated valve construction containing near the outlet portion thereof a first embodiment of a means constructed in accordance with the present invention for reducing the torque required to turn an upstream flow control disk relative to a downstream flow control disk.

In FIG. 1 there is illustrated a valve which includes a valve body 2 having an inlet portion 4 and an outlet portion 6. Outlet portion 6 is illustrated as being removably fastened to inlet portion 4 by bolts 8. However, it will be understood that any suitable means for securing outlet portion 6 to inlet portion 4, e.g. mating threading, may be used instead of bolts 8, if desired. A fluid-tight seal is formed between outlet portion 6 and inlet portion 4 by an O-ring 10. Outlet portion 6 forms an interior seat or shoulder 12 for supporting an end of a removable tubular sleeve or insert member 14. Insert member 14 is a one-piece casting formed of stellite or stainless steel and is provided in valve 2 to protect the downstream region of the inlet portion 4 as well as the outlet portion 6 form abrasion caused by both the erosive high pressure of the fluid passing through the valve and any abrasive contaminants which may be carried by the fluid.

As depicted in FIG. 1, insert member 14 is provided with a plurality of positioning bores 14A and shoulder 12 is provided with a similar plurality of bores 12A which are alignable to receive positioning pins 16 therethrough. At such times when the pins 16 are received in the aligned bores 12A and 14A, the insert member 14 is locked against rotation relative to the valve body 2. Although not illustrated, it is contemplated that other suitable means may be used to anchor the insert member 14 relative to the valve body. For example, one or more pins 16 may be anchored in and extend radially inwardly of the inner wall of the downstream portion of inlet portion 4 proximate to outlet portion 6. These pins could then be received in corresponding axially extending slots provided in the outer circumferential cylindrical wall of the insert member 14. Such a construction would act as another of the many possible means to prevent rotation of the insert member 14 relative to the valve body.

Figure 5:
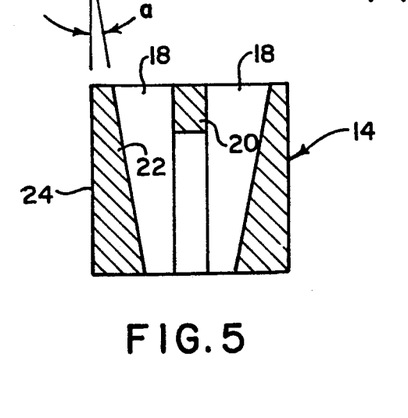
FIG. 5 is a sectional view taken along line V—V of FIG. 3

At its opposite or upstream end, the insert member 14 has a pair of openings 18 preferably cast integral with insert member 14. At the downstream end of insert 14, openings 18 merge to form a single outlet opening which corresponds in diameter to the outlet opening provided in outlet portion 6 so as to prevent unwanted turbulence in the unprotected or unlined region of the outlet portion 6 of the valve body 2. The interior wall 22 of the insert 14 is generally frusto-conical in configuration tapering radially inwardly from the upstream end to the downstream end of the insert at an angle "a", most clearly seen in FIG. 5, of approximately 15° relative to the outer circumferential wall 24 of the insert. Such a gradual angle of taper further serves to limit turbulence in the fluid as it passes through the valve.

Support means 20 spans the diameter of the upstream end of the insert member 14 and forms a support member for contacting and supporting the downstream face of a downstream disk member 26 against flexure for reasons to be described in greater detail hereinbelow. Opposite halves of the cross-bar type support means 20 form means which protrude into the circular transverse cross section of the insert 14 and have bores 14B formed therein for receiving positioning pins (not shown). The positioning pins are received at their opposite ends in similar opposed bores 26B (FIGS. 21 and 24) provided in disk 26 which are alignable with bores 14B in insert 14 to interlock disk member 26 against rotation relative to insert member 14. Therefore, when the valve is properly assembled, the disk member 26, being locked against rotation relative to insert member 14, is also accordingly locked against rotation relative to the valve body 2. Consequently, the disk member 26 may be conveniently referred to as stationary downstream disk 26.

A rotatable upstream disk 28 is situated in face-to-face abutting contact with the upstream side of the downstream disk 26. In the embodiment of the invention illustrated in FIG. 1, upstream disk 28 is retained in a first end of a cast disk carrier 30 by a tight friction fit so as to be rotatable therewith. However, other suitable means, such as those described hereinbelow in reference to the embodiment of the invention depicted in FIG. 15, may be used to interlock the disk 28 for rotation with the disk carrier 30, if desired.

Formed on the second end of disk carrier 30 is a stem 32 preferably having a hex drive at the distal end thereof. When the stem 32 is turned by an actuator 34 operably connected thereto, the upstream disk 28 is caused to rotate relative to the downstream disk 26. Actuator 34 may either be motorized or manually operated depending on the amount of torque required to turn upstream disk 28 relative to stationary downstream disk 26. Downstream disk 26 possesses fluid conducting passageways 26A which remain in constant alignment with openings 18 in insert 14; and upstream disk 28 possesses fluid conducting passageways 28A which are brought into or out of alignment with passageways 26A to permit fluid to pass through the valve. The degree to which passageways 26A and 28A are aligned determines the volume of flow through the valve. The pressure of the fluid upstream of disk 28, serves to aid in retaining the disks 26 and 28, the insert 14, and the shoulder 12 of outlet portion 6 in abutting relationship.

The stem 32 of the disk carrier 30 passes through a bore 35 provided in a bonnet portion 36 of valve body 2 and is sealed relative to the bonnet portion by a pair of spaced O-rings 38. Bonnet portion 36 is provided with flange 40 through which fasteners such as bolts 42 are passed in order to fasten the bonnet portion 36 to the inlet portion 4 valve body. However, as with outlet portion 6, bonnet portion 36 may threaded into inlet portion 4, if preferred. Bonnet portion 36 is sealed with respect to inlet portion 4 by O-ring 44.

Bonnet portion 36 is further formed with a second flange 46 to which a flange of the actuator 34 may be secured as, for example, by bolts 48. With such a construction, especially when used with a relatively rigid bushing member 50 closely received within a pocket 52 formed in bonnet portion 36 and closely surrounding stem 32, the stem 32 is thereby maintained in true alignment with a common central axis 21 of the disks 26, 28 thus reducing the shear and tension stresses on bolts 42 caused by rocking of the stem 32 within the bonnet portion 36.

Before the bonnet portion 36 is fastened to the inlet portion 4 of valve body 2 the insert 14 and disk 26 are properly aligned and positioned by their respective positioning pins. An O-ring 54 is then placed around disk 26 and is driven into a seating position by a leading rim position 56 of disk carrier 30. In this manner the disks 26 and 28 and insert 14 are fluid sealed relative to the valve body 2. Also, assembly of the valve is simplified since the positioning bores in disk 26 may be easily aligned and registered with the positioning pins received in the positioning bores 14B of the insert member 14 through relatively effortless rotation of disk 26 relative to insert 14. If, however, the O-ring 54 were carried with the disk 26 as it were placed in the valve body 2 and the positioning bores in disk 26 were not in proper alignment with the positioning bores 14b in insert 14, the inherent friction between the O-ring and the valve body would require one assembling the valve to exert a significant amount of torque on disk 26 in order to properly align the interlocking bores so that the positioning pins may be properly received therein.

Figure 2:
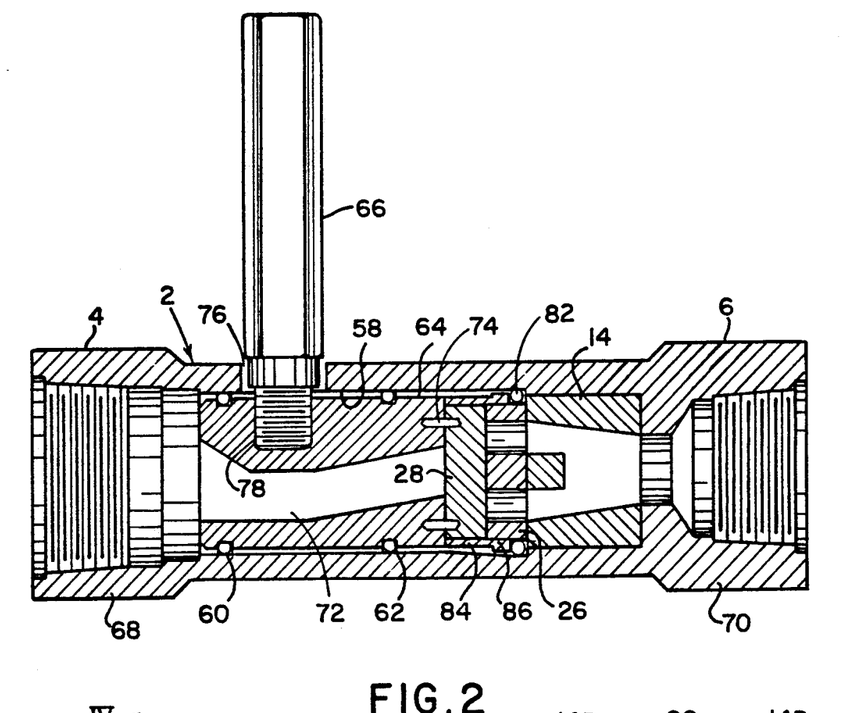
FIG. 2 is a side view in section of a second type of multiple orifice disk-operated valve construction also containing near the outlet portion thereof the first embodiment of the torque reducing means shown in FIG. 1.
Figure 3:
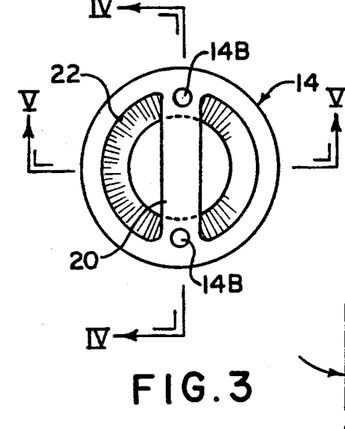
FIG. 3 is an enlarged front/plan view of the first embodiment of the torque reducing means of the present invention.
Figure 4:
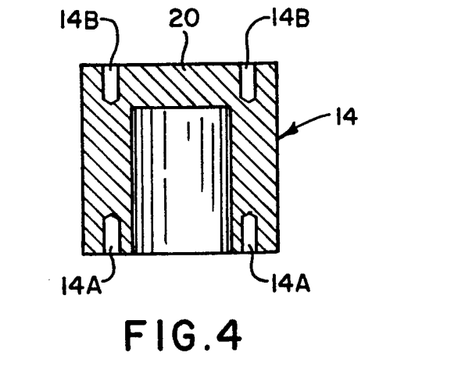
FIG. 4 is a sectional view of the first embodiment of the torque reducing means of the present invention taken along line IV—IV of FIG. 3.

Turning now to FIG. 2, where like reference characters represent similar elements, as is true in the remaining figures, there is depicted an in-line multiple orifice valve construction similar to that disclosed in my co-pending U.S. patent application Ser. No. 264,855.

In FIG. 2 there is illustrated an in-line valve which includes a valve body 2 comprising a unitary member having an inlet portion 4 and outlet portion 6. However, it is contemplated that, if desired, the valve body 2 may be formed of multiple separate body segments, such as in the FIG. 1 embodiment. An internal cavity in the valve body is provided reduced diameter cylindrical cavity 58 wherein fluid tight sealing is established between O-rings 60 and 62 carried by a rotor spool 64. An important feature arising out of the one-piece construction, which is particularly adaptable to in-line valve body constructions such as the valve body 2 of FIG. 2, is that rotor spool 64 can be removed from the valve body by first removing an actuator or control handle 66 and then withdrawing the rotor spool 64 through the inlet portion 4. In this way, the valve body can be manufactured more economically. Moreover, such a construction of the in-line valve allows assembly of the internal components through the inlet, thus eliminating clamping together flanges in a fluid tight manner as required when the valve body is made up of two valve body parts as is a conventional valve body. The inlet portion 4 is formed by an enlarged hub 68 having internal threads for receiving a corresponding threaded end portion of a pipe. Similarly, outlet portion 6 is formed by an enlarged hub 70, having an internally threaded portion which can receive a pipe for the discharge of fluid from the valve.

As seen in FIG. 2, the inlet 4 extends to the cylindrical cavity 58. The rotor spool 64 is positioned in the cylindrical cavity 58 and the O-rings 60 and 62 are mounted in grooves formed in the rotor spool 64 near the terminal ends thereof to form a fluid tight seal with the valve body 2 in order to prevent the passage of fluid between the rotor spool and the valve body. Fluid supplied to the valve from the inlet can pass through a passageway 72 in the rotor spool 64. In this embodiment, the passageway 72 extends in the longitudinal direction along the length of the spool. At the end of the spool which faces toward the outlet 6, the cavity 58 extends beyond the end of the spool. The rotatable disk 28 is drivingly interlocked with the rotor spool by pins 74 which extend into openings in the disk 28 and openings in the end face of rotor spool. The spool 64 can be rotated by the control handle 66, which is provided with a threaded end portion that can pass through an annular slot 76 in valve body 2, where the threaded end portion of handle 66 engages in a threaded opening 78 formed in the spool to retain the spool in the cylindrical cavity 58 of valve body 2. It will be observed that the slot 76 is situated along the valve body 2 between the support sites for the two O-rings 60 and 62. By rotating the spool 64 through operation of the handle 66, the spool rotates about an axis corresponding to the longitudinal axis of the cylindrical shaped rotor spool.

Figure 9:
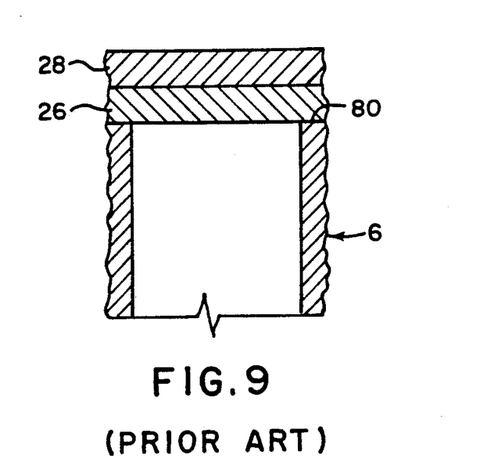
FIG. 9 is a partially cut sectional view of an outlet portion of a typical prior art valve body housing forming a circular shoulder upon which the peripheral regions of a stationary downstream disk of a multiple orifice valve may rest.

The rotation of the spool 64 imparts a rotary movement to the disk 28 such that in the embodiment shown in FIG. 2, openings or fluid passageways provided in disk 28 can be moved into and out of alignment or registration with corresponding openings or passageways provided in a downstream stationary disk 26 in a manner similar to that described in the operation of the valve depicted in FIG. 1. The disk 26 is held in a stationary manner relative to the valve housing by anchor pins (not shown) which are received at opposite ends thereof in drilled openings 26B (FIGS. 21 and 24) formed in the disk 26 and the openings 14B formed in the replaceable sleeve or insert 14; or, when such a sleeve 14 is not utilized, the anchor pins are received in similar drilled openings provided in a ledge surface 80 formed by a reduced step in the diameter of the opening in the outlet portion 6 of the valve body 2 as best seen in FIG. 9. The insert 14 is placed into the valve body 2 by passing the insert through the inlet opening and the cylindrical cavity 58. As in the embodiment of FIG. 1, the diameter of the outlet of insert 14 is designed to match the diameter of the unlined inner wall of the outlet portion 6 of the valve body to prevent unwanted turbulence in the unprotected or unlined outlet portion of the valve body.

As also shown in FIG. 2, in order to prevent unwanted flow of fluid between the sleeve and the valve housing, there is provided an O-ring 82, similar to O-ring 54 in FIG. 1, which is seated in a gap formed between the outer circumferential surface of disk 26 and the inner wall of the valve housing. The positioning of the O-ring is such that it is seated at the parting line between the insert 14 and the valve seating surface of the housing.

Continuing with the description of FIG. 2, it can be seen that the O-ring 82 is retained in close proximity to its desired sealing site by a cylindrical extension 84 of the rotator spool 64 which is similar to the rim portion 56 of disk carrier 30 depicted in FIG. 1. The cylindrical section 84 is provided with a relatively thin wall section having at its terminal end a thickened restraining section 86 which is an enlargement of the outside diameter of section 84. The end face of restraining section 86 is sufficiently broad to entrap the O-ring 82 and prevent unwanted displacement of the O-ring 82 away from its intended sealing site. The extension 84 of the rotor spool 64 serves further to facilitate assembly of the valve by holding the disks 28 and 26 in their confronting face-to-face relationship with the upstream disk 28 being locked by the pins 74 to the rotor spool 64. In the normal operation of the valve, the inlet pressure is higher than the outlet pressure, thus allowing fluid to flow from the inlet to the outlet and, as indicated previously, the flow is controlled by the relative positions of the openings in the two disks. The O-ring is held in place by friction and differential pressure urging the O-ring 82 toward the low pressure side of the valve.

In the past, sudden changes in the downstream conditions for the fluid, such as a valve closing or a sudden drop in flow conditions would cause a hydraulic hammer, resulting in a momentary pressure pulse in the outlet that is higher than the fluid pressure in the inlet. This pressure pulse can be large enough, in some instances, to unseat conventional seals provided by unsupported O-rings. Once the O-ring sealing has been disrupted, the normal operation of the valve would allow a fluid flow, although small, between the disk sidewalls and the cavity formed in the valve body. The material used to form the valve body normally cannot withstand the abrasive cutting action caused by the by-pass flow of fluid and thus, irreparable damage would occur. In other instances, a deliberate back-flush of fluid is caused to occur for any one of numerous reasons. Hence, there is established a flow of fluid through a valve in a reverse direction, i.e., outlet to inlet, the result is the same as the result produced by a hydraulic hammer. To correct this, the extension 84 to the rotor spool 64, as described above, avoids the unseating of the sealing O-ring 82. The restraint established by the end wall 86 can be provided by dimensioning the thin wall of section 84 to prevent rubbing or friction during adjustment of the valve for normal operation and to form a limit of travel for the O-ring 82. If a reverse flow or pressure change in the reverse direction occurs, the sealing O-ring or moves only as far as allowed by the restraint provided by the wall 86. The extent of movement is such that the O-ring 82 is essentially retained in place between the disk 26 and the valve body so that when normal pressure flow conditions are restored to the valve, the O-ring immediately assumes its proper sealing relationship, if it is not already in such a position. As with the construction of the disk carrier rim portion 56 described in FIG. 1, the provision of the extension 84 to the rotor spool 64 offers the further advantage that the O-ring 82, which must be wedged tightly and uniformly in place about the periphery of the disk 26, can be achieved without the need for special implements. In the past when the O-ring 82 was placed in the sealing site, it was common to wedge the O-ring through the use of a pointed blade, such as a screw driver. Using such a method, good uniform seating of the O-ring could not be assured. However, with the provision of the extension 84 to the spool 64, as with the provision of rim portion 56 of disk carrier 30 shown in FIG. 1, an automatic, continuous and relatively effortless seating of the O-ring 82 is provided. It is to be understood, however, that the retention function of the cylindrical extension 84 of the spool 64 can be achieved by providing, for example, an extension to the valve body arranged to protrude into the opening formed in housing for receiving the disks.

Figure 6:
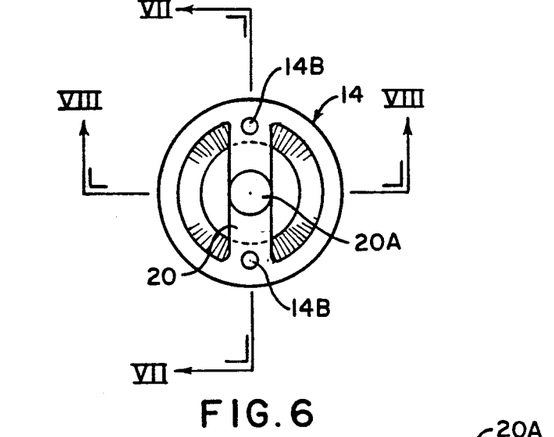
FIG. 6 is a front/plan view similar to FIG. 3 of a second embodiment of a torque reducing means of the present invention.
Figure 7:
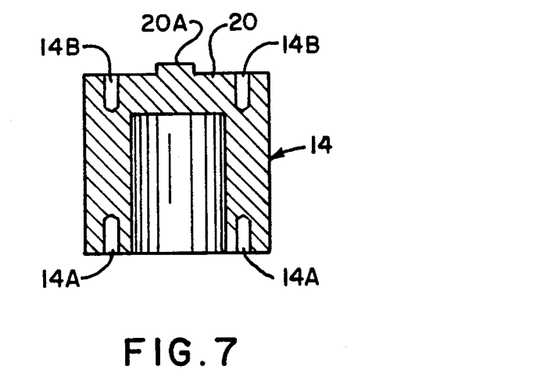
FIG. 7 is a sectional view of the second embodiment of the torque reducing means of the present invention along line VII—VII of FIG. 6.
Figure 8:
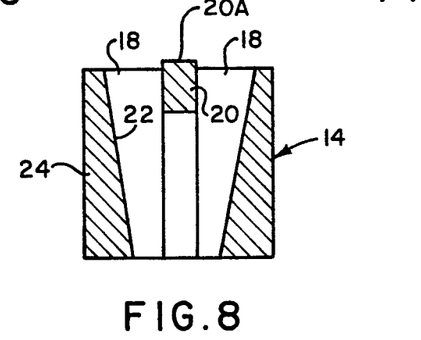
FIG. 8 is a sectional view taken along line VIII—VIII of FIG. 6.

An alternative embodiment of the removable protective sleeve or insert member 14 is depicted in FIGS. 6-8. Constructed substantially the same as the insert illustrated in FIGS. 1-5, the insert of FIGS. 6-8 differs essentially only in its inclusion of a round raised portion 20A formed at the center of the cross-bar type support means 20. Raised portion 20A protrudes outwardly from the upstream end of the insert 14 and the degree to which it protrudes in the drawing figures is greatly exaggerated for purposes of illustration. For example, raised portion 20A generally protrudes outwardly from the upstream end of the insert by distances of approximately 1 mm or less.

In the various aforementioned embodiments of the valve body and/or insert, the pressure differential, or pressure of fluid blocked by the disks, applies a force sufficient to hold the disks in their confronting face-to-face relation, and, at the same time, presses the sleeve against the valve body housing under a sufficient force to maintain a seated relationship. However, a further feature of the valve construction of the present invention serves to enhance the maintenance of the disks in their confronting face-to-face relationship. According to the present invention, each of the disks 26 and 28 are formed of material which is virtually rigid such as hard metals, metal alloys, ceramics, etc. These essentially rigid disks 26 and 28 are machined or polished to an extremely high degree of surface quality, i.e., a smoothness to within approximately 2 $\mu$m RMS of a perfectly smooth surface, on at least the faces thereof which are in face-to-face contact with one another.

The most prominent advantages of providing such a high degree of surface quality on the contacting faces of the disks 26 and 28 are: 1) the rotation of the disk 28 relative to stationary disk 26 is performed in a smooth unfaltering manner, and 2) tremendous adhesion is created between the contacting faces of the disks which serves to maintain the disks in face-to-face contact and eliminates the need for providing additional sealing means to seal the perimeter of the contacting faces.

However, there are instances, particularly when the fluid pressures within the valve become extreme, that the adhesion created between the highly polished contacting faces of the disks 26 and 28 becomes a disadvantage rather than an advantage. The disks, although virtually rigid and incompressible, do compress and flex somewhat under extreme pressure conditions. Thus when subject to extreme fluid pressures, the virtually perfectly smooth contacting faces are brought into even closer contact with one another due to the slight compression of the material forming the disks. It is at such times that the adhesion between the disks can become immense and the torque then required to turn disk 28 relative to disk 26 becomes proportionately great.

The diameter of the disks and, more particularly, the area of contact therebetween, further plays a role in determining the amount of torque required to turn disk 28 relative to disk 26. In other words, as the diameter of the disks and thus the area of contact therebetween increases, the adhesion, which is a function of the contact area between the disks, proportionately increases. Hence, the torque required to turn disk 28 relative to disk 26 may become quite substantial as the disks become relatively large in diameter.

This particular phenomenon is especially realized in the embodiment of the valve depicted in FIG. 1 wherein substantially the entire area of the upstream face of rotatable disk 28 is exposed to fluid pressure. In field applications of the valve of FIG. 1 wherein large fluid flow volumes and pressures are encountered, such as, for example, in petroleum and/or natural gas production wells, the diameters of the disks 6 and 28 may be on the order of 4 inches or greater. And with such large disk diameters, there is created an accompanying large degree of adhesion between the disks, especially when their contacting surfaces are polished to a surface quality of within approximately 2 $\mu$m of a perfectly smooth surface.

As will be appreciated from the following, however, the inclusion of the cross-bar type support means 20 in the insert member 14 serves to greatly reduce the deleterious effects that the extremely smooth contacting faces, the high fluid pressures and the large disk diameters have on the adhesion between disks 26 and 28 and, hence, the torque required to turn disk 28 relative to disk 26.

Turning now to FIG. 9, there is shown a cut-away view of an outlet portion 6 of a typical multiple orifice valve. The upstream end of the outlet portion 6 forms a shoulder or ledge 80 upon which the circumferential regions of a stationary disk, such as disk 26, are supported. A simple schematic force diagram of this arrangement illustrating the distribution of forces when the disks are subjected to fluid pressure is depicted in FIG. 10.

Figure 10:
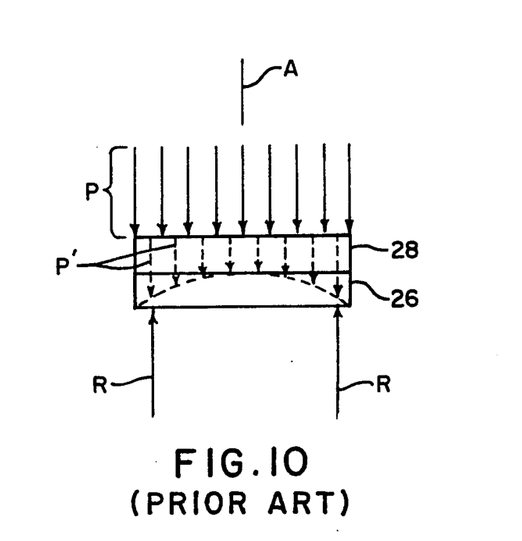
FIG. 10 is a force diagram illustrating the forces exerted by the sleeve member of FIG. 9 against a pair of multiple orifice valve disks, as well as the forces occurring within the disks, when the disks are subjected to fluid pressure.

As can be seen in FIG. 10 the pressure exerted by a fluid against the upstream face of upstream disk 28 is represented by load P of uniform magnitude. Load P is exerted uniformly across the upstream face of upstream disk 28. Along the circumferential regions of the downstream face of downstream disk 26, force P is countered by uniform magnitude circumferentially distributed reaction forces R exerted by ledge 80. For purposes of illustration, it will be appreciated that fluid pressure P is communicated through the material of disks 26, 28 by "virtual" force vectors P' represented in phantom in FIG. 10. As can be seen, the magnitude of the virtual force vectors P' are greatest nearest the periphery of the disks 26, 28 and least along the central rotational axis A of disk 28 which, incidentally, is coaxial with axis 21, due to the location of reaction forces R. This essentially means that the disks are pressed together to a greater degree at their peripheral regions, i.e., the virtual force vectors are highest in these regions and they are the regions of greatest radius or moment arm from rotation axis A. Since the disks are pressed together to the greatest degree at their peripheries, the adhesion or friction forces between the disks is greatest in these regions and a substantial amount of turning torque is required to overcome these extremely high adhesion forces localized at regions most distant, or at greatest moment arm, from the axis A (or axis 21).

Figure 11:
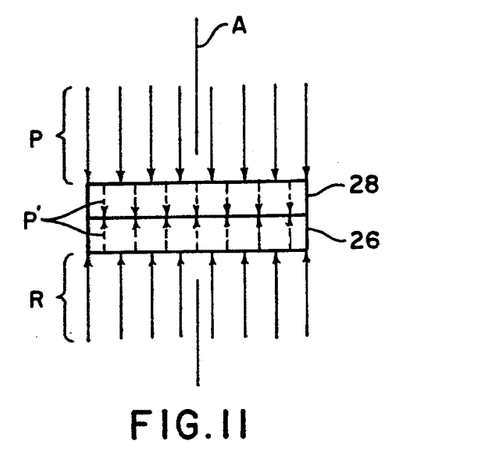
FIG. 11 is a force diagram illustrating the forces exerted by the first embodiment of the torque reducing means of the present invention depicted in FIG. 1 through FIG. 5 against a pair of multiple orifice valve disks, as well as the forces occurring within the disks, when the disks are subjected to fluid pressure.

Turning now to FIG. 11, there is depicted a similar schematic force diagram representing the effect of the cross-bar type support means 20 of the insert 14 depicted in FIGS. 1-5 on the distribution of forces in disks 26 and 28. As noted previously, cross bar support means 20 of the embodiment of FIGS. 1-5 contacts and supports the downstream face of downstream disk 28. By spanning the diameter of the insert 14 and thus contacting and supporting the downstream face of downstream disk 28 virtually across its diameter, support means 20 serves to prevent localized excessive compression and/or flexure of the disks. Therefore, the uniform fluid pressure P is thus effectively countered by a substantially equivalent and uniform reaction force R exerted by the support means 20 across the downstream face of disk 28. Accordingly, since extremely high magnitude virtual force vectors P' are no longer concentrated at greatest distance from rotational axis A, less torque is required to turn the disk 28 relative to disk 26 when support means 20 is present than when it is not.

Figure 12:
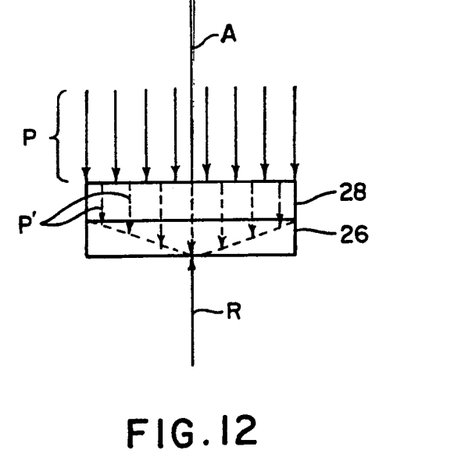
FIG. 12 is a force diagram illustrating the forces exerted by the second embodiment of the torque reducing means of the present invention depicted in FIG. 6 through FIG. 8 against a pair of multiple orifice valve disks, as well as the forces occurring within the disks, when the disks are subjected to fluid pressure.

FIG. 12 represents a schematic force diagram representing the effect of the embodiment of the insert 14 depicted in FIGS. 6-8 on the distribution of forces in disks 26 and 28. As noted previously, the support means 20 in FIGS. 6-8 is provided with a round, slightly raised portion 20A. As can be seen in FIG. 12, the raised portion 20A supports the centralmost most regions of the downstream face of disk 26. Therefore, the uniform fluid pressure P is funneled through virtual force vectors P' to be countered virtually entirely by a limited and centralized area of reaction forces represented for purposes of illustration as reaction force R located along the axis A. Thus, the virtual forces P' are greatest closest to the axis A, i.e., they are of short moment arm from axis A, and least at regions of greatest radius therefrom. Consequently, since the greatest virtual forces P' pass essentially through the axis A, they tend to press the disks together only along a region closely surrounding axis A. Only a small amount of the fluid pressure P is translated into virtual force P' at the peripheral regions of the disks and this is essentially absorbed within the flexure permitted by the elastic limit of the material of the disks. Hence, compression and flexure forces of inconsequential value are exerted at peripheral regions of the disks and the greatest forces are located substantially along the axis A, and these "centralized" forces have virtually negligible moment arms.

Therefore, when the disks are supported by raised portion 20A of support means 20, the adhesion between the discs is essentially unaffected by the pressure P. Thus, the torque required to turn disk 28 relative to disk 26 is least when disk is centrally supported on raised portion 20A of support means 20. It should be understood, however, that there will probably be slight contact between the peripheral portion of disk 26 and ledge 80 due to slight flexure of the disks when the disk 26 is centrally supported by raised portion 20A and the disks are under extreme fluid pressures.

Figure 13:
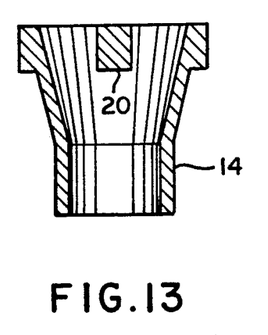
FIG. 13 is a sectional view of a third embodiment of the torque reducing means of the present invention.
Figure 14:
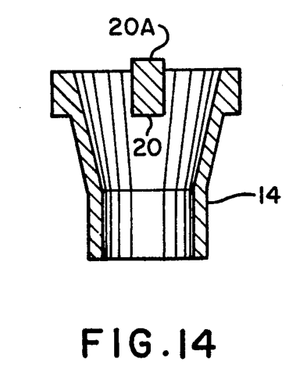
FIG. 14 is a sectional view of a fourth embodiment of the torque reducing means of the present invention.

Turning to FIGS. 13 and 14, it is further contemplated that the insert member 14 of the present invention may take other suitable configurations such as, for example, cross-sections like those insert members disclosed in my aforementioned copending U.S. patent application Ser. Nos. 450,549 and 264,855, i.e., an insert having an inwardly tapering frustoconical upstream portion leading to a cylindrical downstream portion. The only requirement of any conceivable configuration of the insert member 14 is that, in accordance with the present invention, the insert member must include a support means for supporting the central or interior regions of the downstream face of the downstream stationary disk. For example, FIG. 13 illustrates an insert similar to the type described in the immediately above-mentioned copending U.S. patent applications including a simple cross-bar type support means 20; and FIG. 14 illustrates a similar insert member in which the cross-bar type support means 20 further includes raised portion 20A.

While only a small number of relatively similar insert configurations have been thus far illustrated and described, it will be appreciated that the protective and supportive insert member 14 of the present invention may be formed of any suitable longitudinal cross-section configuration or of any suitable transverse cross-section configuration, e.g., oval or elliptical in transverse cross-section, so that it may be easily retrofitted, along with disks 26 and 28, if desired, into the outlet portions of a wide variety of existing valve constructions in order to provide longer life and more efficient operation of such valves.

Figure 15:
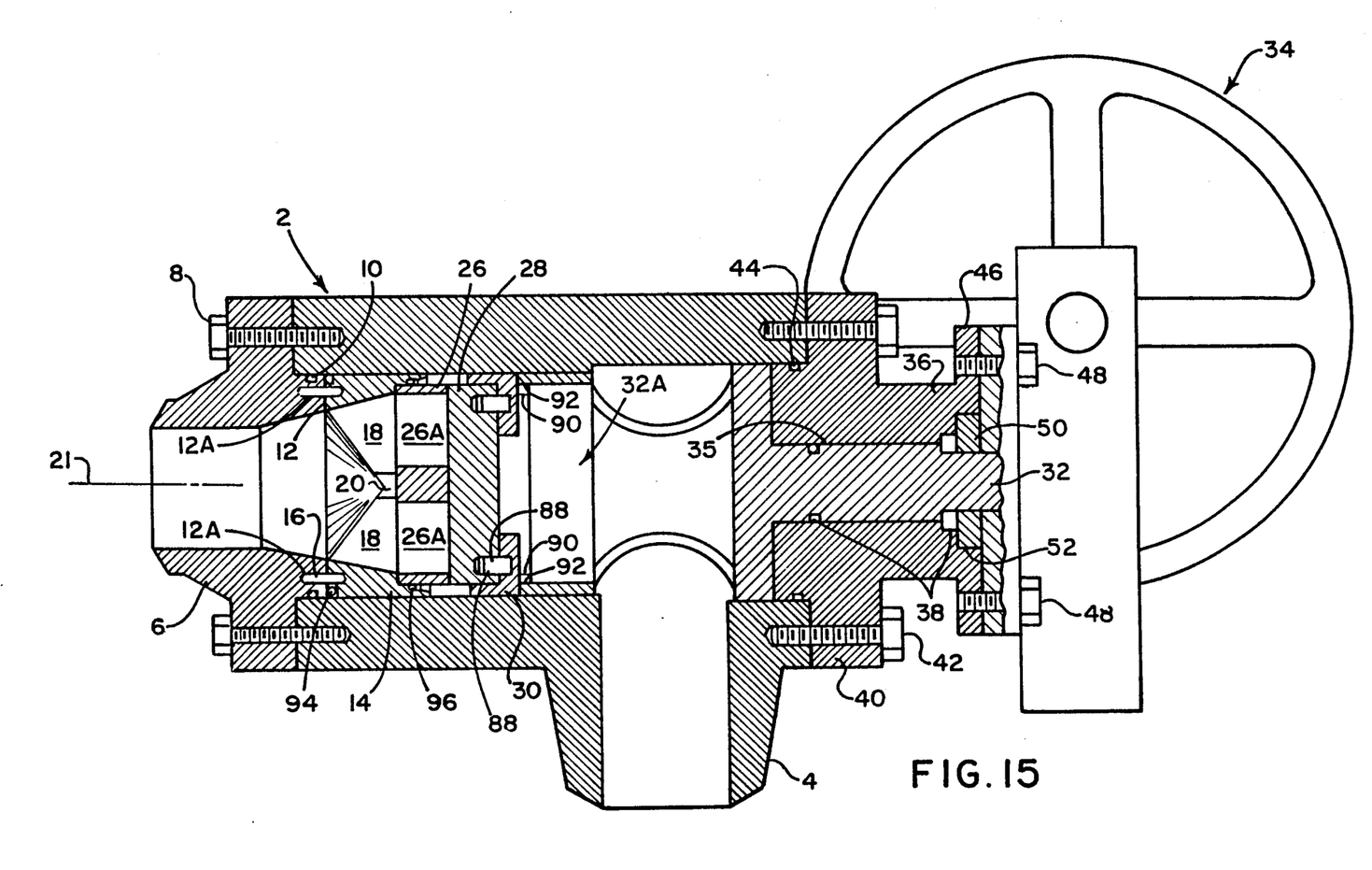
FIG. 15 is a view similar to FIG. 1 but instead containing near the outlet portion thereof a fifth embodiment of the torque reducing means of the present invention.

An example of another suitable configuration for tubular insert 14 which is in accordance with the present invention is illustrated in FIGS. 15-19. The valve construction with which insert 14 is used in FIG. 15 is generally similar to that shown in FIG. 1; however, there are some structural differences which merit further elaboration. For example, as stated hereinabove, means other than a tight friction fit between the disk carrier 30 and upstream disk 28 may be employed in order to interlock disk 28 with disk carrier 30. In FIG. 15 these means includes positioning pins 88 which are received at opposite ends thereof in opposed bores provided in the upstream face of disk 28 and the downstream face of disk carrier 30. In the embodiment of the invention depicted in FIG. 15 disk carrier 30 is separate from the stem 32 and is provided with peripheral notches 90 at its upstream end which receive peripheral projections 92 formed on a downstream end 32A of stem 32. Hence, turning of actuator 34 causes turning of disk carrier 30 and upstream disk 28, just as in the valve construction exemplified by FIG. 1.

Sealing between the tubular insert member 14 and the valve body 2 of the valve disclosed in FIG. 15 is accomplished by an O-ring 94 provided in an annular recess in the outer circumferential wall of the insert and contacting the inner wall of the valve body.

An interlock between the insert 14 and the downstream disk 26 is provided by positioning pins (not illustrated) which are received at their opposite ends in bores 14B and 26B in the same manner as that described with regard to FIG. 1. To further ensure fluid sealing and tight frictional engagement between the insert 14 and the disk 26 shown in FIG. 15, there is positioned about the periphery of the disk 26 an O-ring 96 which is sized so as to contact an inner circumferential wall surface 98 of insert 14 and which is adapted to be press-fitted into seated position against a shoulder 100 (FIGS. 16 and 19) provided at the upstream end of insert 14 coplanar with the upstream face of support means 20. With such a construction, disk 26 is assuredly fixed in position relative to insert 14 in a non-slipping, non-vibrating manner. If desired, a similar sort of fitting arrangement can be provided between upstream disk 28 and disk carrier 30. Moreover, the provision of the O-ring 96 permits the disk 26 to be separated from insert 14 without the application of heat which is typically required in assemblies wherein the flow control disks are firmly press-fitted into disk-supporting structures, such as in U.S. Pat. No. 3,207,181.

Figure 16:
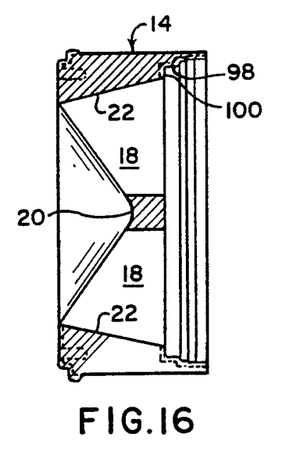
FIG. 16 is an enlarged sectional view of the fifth embodiment of the torque reducing means depicted in FIG. 15.
Figure 17:
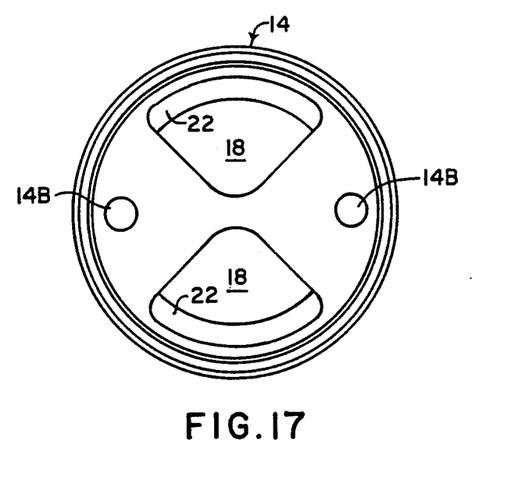
FIG. 17 is a view of the upstream end of the fifth embodiment of the torque reducing means illustrated in FIG. 16.
Figure 18:
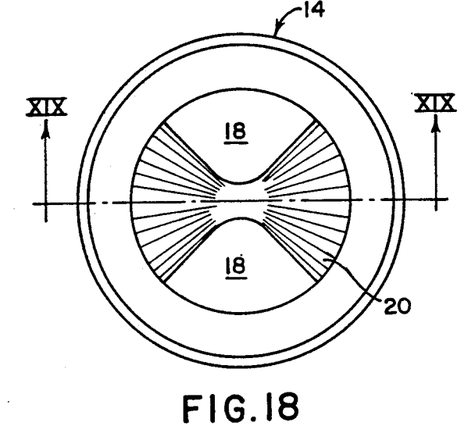
FIG. 18 is a view of the downstream end of the fifth embodiment of the torque reducing means illustrated in FIG. 16.
Figure 19:
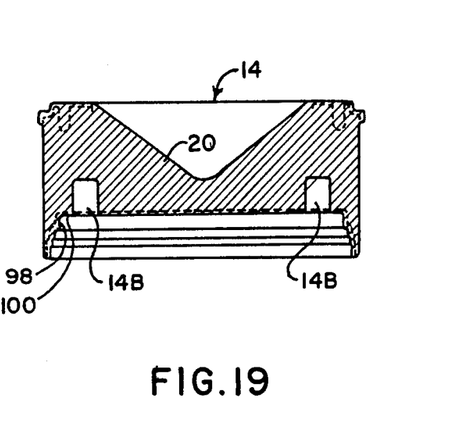
FIG. 19 is a sectional view of the fifth embodiment of the torque reducing means taken along line XIX—XIX of FIG. 18.

The interior wall 22 of the tubular insert disclosed in FIGS. 15–19, like that illustrated in FIG. 1, is generally right circular frusto-conical in configuration tapering radially inwardly from the upstream end to the downstream end of the insert such that the outlet opening of the insert corresponds in size to the discharge opening in the valve outlet 6, thereby reducing turbulence and pressure drop in the fluid as it passes through the insert and out of the valve FIGS. 16–18 illustrate that the fluid conducting openings 18 the insert 14 are generally circular sector shaped. Furthermore, regardless of the shape of the fluid openings 18, it is preferred that the cross-bar type support means 20 gradually increase in thickness at both increasing radius and toward the downstream face of the insert in order to provide the support means with maximum strength while minimizing impedance to fluid flow through the insert.

For purposes of brevity, a schematic force diagram representing the effect of the cross-bar type support means 20 of the insert 14 depicted in FIGS. 15–19 is not included in the present discussion. However, as the reader will appreciate, by its analogous construction to that of the insert 14 of FIGS. 1–5, the insert 14 of FIGS. 15–19 will produce a schematic force diagram substantially identical to that shown in FIG. 11. Consequently, at this juncture, it should be apparent that the insert shown in FIGS. 15–19 and described hereinabove is effective in reducing the torque required to turn the upstream disk 28 relative to the downstream disk 26 for the same reasons as the insert 14 of FIGS. 1–5.

In accordance with the broadest objects hereof, the present invention is directed toward the provision of means for reducing the torque required to turn an upstream disk relative to a downstream disk in a multiple orifice disk-operated valve construction. Accordingly then, the means for reducing such torque are not and should not be construed to be limited only to variously-configured tubular insert structures having members which support central regions of the downstream face of a stationary downstream disk. These torque reducing means may also be suitably provided as portions or components of the disks themselves.

For example, FIGS. 20–24 present various views of two different disk structures wherein the torque reducing means is formed as an integral part of a flow control disk. In particular, the torque reducing means of these drawing figures are illustrated as being provided on the stationary downstream disk 26 at its upstream face which abuts the upstream disk. It is contemplated, however, that the torque reducing means to be described hereinbelow may be equally effective if provided only on the upstream disk at its downstream face or on both of the abutting faces of the disks.

The disks shown in FIGS. 20–24 may be used in any of the valve constructions depicted in FIGS. 1, 2 or 15, or in virtually any multiple orifice disk-operated valve having a stationary downstream flow control disk and an upstream flow control disk in abutting contact with and movable relative to the downstream disk.

Figure 20:
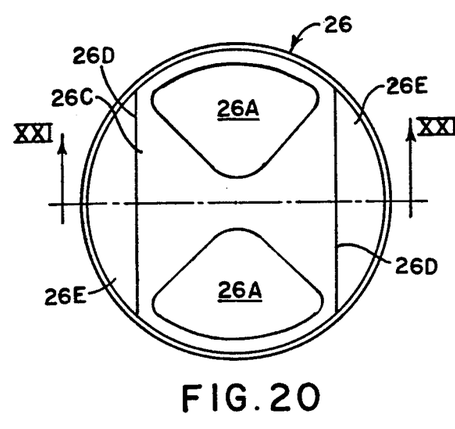
FIG. 20 is an end view of a multiple orifice flow controlling valve disk incorporating a sixth embodiment of the torque reducing means of the present invention.
Figure 21:
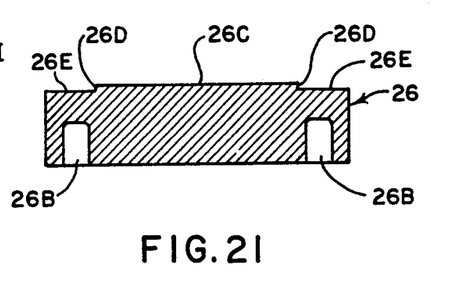
FIG. 21 is a sectional view taken along line XXI—XXI of FIG. 20.

Turning first to FIGS. 20 and 21 there is seen an end view of the upstream face and a sectional view, respectively, of a stationary downstream disk 26 which is suitably adapted for use in a multiple orifice disk-operated valve. Disk 26 in FIG. 20 is seen to include generally circular sector shaped fluid openings 26A, although any suitable fluid opening shape may be utilized, if desired. As perhaps best seen in FIG. 21, a raised planar face portion 26C protrudes from the upstream face and is adapted for abutting contact with the downstream face of a movable upstream disk 28. The degree to which raised face portion 26C protrudes is somewhat exaggerated for purposes of illustration. That is, the raised portion generally protrudes outwardly from the upstream face of disk 26 by distances of approximately 1 mm or less. From reference to FIG. 20 it is seen that the boundary of the raised portion 26C is defined by raised parallel chord walls 26D and opposed lengths of the circular periphery of the disk to form an area sufficient to contain the boundaries of the fluid conducting openings 26A.

The provision of the raised portion 26C, which abuts the downstream face of the upstream disk, causes the formation of relatively recessed circular segment face portions 26E, thereby serving to reduce and centrally localize the area of contact between the disks. Therefore, in a fashion similar to that represented schematically in FIG. 12, the force of a uniform fluid pressure applied to the upstream face of the upstream disk is funneled through virtual force vectors in the upstream disk to be countered virtually entirely by a relatively limited and centralized area of reaction forces which are exerted from the downstream disk 26 within an area bounded by the area of the raised portion 26C. Thus, the virtual forces and the reaction forces at the abutting disk faces are generally localized and of greatest magnitude near the common central axis of the disks, i.e., axis 21. Consequently, since the greatest virtual forces and reaction forces pass essentially through a region relatively close to the common central axis, they tend to press the disks together most strongly in a region closely surrounding the central axis. Only a small amount of the fluid pressure is translated into virtual force at the peripheral regions of the disks and this is essentially absorbed within the flexure permitted by the elastic limit of the material of the disks. Hence, compression and flexure forces of inconsequential value are exerted at peripheral regions of the disks and the greatest forces are located substantially along the central axis, and these "centralized" forces have substantially negligible moment arms; accordingly, the adhesion between the disks is largely unaffected by the fluid pressure on the upstream disk. Thus, the torque required to turn upstream disk 28 relative to disk 26 when disk 26 is provided with a central raised portion such as, for example, portion 26C, is less than the torque required to disk 28 relative to disk 26 when both the abutting faces of the disks are perfectly planar, i.e., when they have no raised central portion. The above is also true if a raised central portion is provided on the downstream face of the upstream disk 28 or, alternatively, on both abutting faces of the disks.

Figure 22:
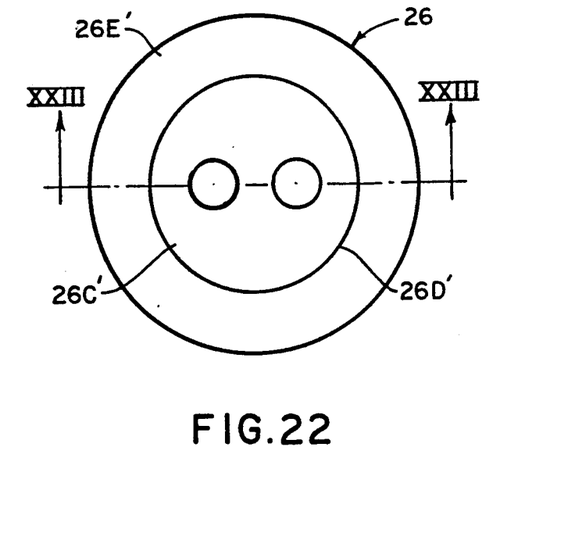
FIG. 22 is a view of one end face of a multiple orifice flow controlling valve disk incorporating a seventh embodiment of the torque reducing means of the present invention.
Figure 23:
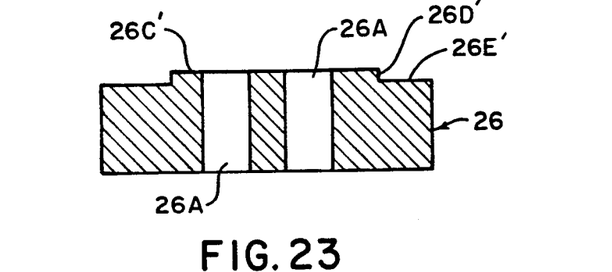
FIG. 23 is a sectional view taken along line XXIII—XXIII of FIG. 22.
Figure 24:
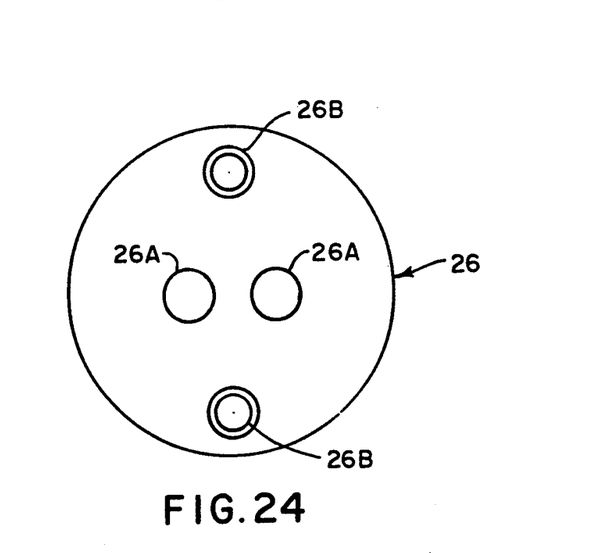
FIG. 24 is a view of the other end face of the disk shown in FIG. 22.

FIGS. 22-24 depict various views of a second contemplated embodiment of a torque reducing means formed as an integral part of a flow control disk. In this case, the area of fluid conducting openings 26A are contained within an area bounded by a central raised portion 26C' protruding from the upstream face of the disk and having a planar face which abuts the downstream face of the movable upstream disk 28. The central raised portion in this instance is defined by a raised circular wall 26D' which causes the formation of a relatively recessed annular ring shaped face portion 26E'. The reader will appreciate that this raised face portion, if provided on either or both abutting faces of the disks, will reduce the torque required to turn the upstream disk relative to the downstream disk for the same reasons as those already discussed in regard to the embodiment of the present invention shown in FIGS. 20 and 21. Furthermore, the configurations of the raised face portions 26C and 26C' of FIGS. 20-23 are merely exemplary of many possible shapes, e.g., oval, elliptical, rectangular, and the like, which may be suitably employed for localizing the area of contact between the abutting faces of the downstream and upstream disks to central regions thereof for the purpose of reducing the torque required to turn the upstream disk relative to the downstream disk in a multiple orifice disk-operated valve.

Also, usage of one sort of torque reducing means disclosed herein, i.e., either the modified insert or the modified disk, does not preclude usage thereof with the other torque reducing means. For example, a tubular insert 14 having a cross-bar type support means 20 for supporting centralmost regions of the downstream disk 26 may be used in combination with abutting flow control disks wherein at least one of the abutting faces of the disks is provided with a slightly raised central region. In fact, such a structural combination represents the most preferred construction according to the present invention since it simultaneously provides maximum torque reduction as well as fluid erosion protection for outlet portions of the valve.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:
1. A valve including the combination of:
   a valve body having an internal cavity with an inlet and outlet for fluid;
   an upstream disk rotatably supported in the cavity of said valve body and having a fluid passageway for conducting fluid;
   means for rotating said upstream disk;
   a downstream disk arranged in a face-to-face and confronting relation with said upstream disk in the cavity of said valve body, said downstream disk having a fluid passageway for conducting fluid from the fluid passageway in said upstream disk;
   a tubular insert supported in said valve body and having a fluid passageway, said tubular insert being interlocked at a first end thereof with said downstream disk and serving to conduct fluid from the fluid passageway in the downstream disk to said outlet, said tubular insert further having a frustoconical interior wall tapering radially inwardly from said first end of said tubular insert toward a second end thereof;
   support means spanning the fluid passageway of said tubular insert, said support means including a raised portion for contacting a central portion of the downstream face of said downstream disk, said raised portion protruding outwardly from said first end of said tubular member; and
   means for interlocking said tubular insert with said valve body.
2. The valve of claim 1 wherein said tubular insert is a cast one-piece member and said support means is cast integrally therewith.
3. The valve of claim 1 wherein said raised portion is circular.
4. The valve of claim 1 wherein said interior wall tapers at an angle of 15° relative to a cylindrical outer wall of said tubular insert.
5. The valve of claim 1 wherein said support means provides support for interior regions of the downstream face of the downstream disk to reduce localized concentrations of forces at peripheral regions of the downstream disk and thereby reduce a torque required to rotate the upstream disk relative to the downstream disk.
6. The valve of claim 1 wherein said support means spans said tubular insert at a location substantially at said first end of said tubular insert.
7. The valve of claim 1 wherein said tubular insert includes a cylindrical portion.
8. A valve including the combination of:
   a valve body having an internal cavity with an inlet and outlet for fluid;
   an upstream disk rotatably supported in the cavity of said valve body and having a fluid passageway for conducting fluid;
   means for rotating said upstream disk;
   a downstream disk having an upstream face arranged in a face-to-face and confronting relation with a downstream face of said upstream disk in the cavity of said valve body, said downstream disk having a fluid passageway for conducting fluid from the fluid passageway in said upstream disk; and
   means for supporting at least one of said disks in a manner to reduce a torque required to turn said upstream disk relative to said downstream disk, said means for supporting comprise means for reducing localization of compression forces at peripheral regions of said disks.

9. The valve of claim 8 wherein said means for preventing localization of fluid compression at peripheral regions of said disks comprises a tubular insert carried in said valve body and having a fluid passageway, said tubular insert being interlocked at a first end thereof with said downstream disk and serving to conduct fluid from the fluid passageway in the downstream disk to said outlet; and support structure spanning the fluid passageway of said tubular insert, said support structure contacting and supporting a downstream face of said downstream disk.

10. The valve of claim 9 wherein said tubular insert is a cast one-piece member and said support structure is cast integrally therewith.

11. The valve of claim 9 wherein said support structure includes a raised portion formed thereon for contacting a central portion of said downstream face of said downstream disk, said raised portion protruding outwardly from said first end of said tubular member.

12. The valve of claim 11 wherein said raised portion is circular.

13. The valve of claim 9 wherein said support structure spans said tubular insert at a location substantially at said first end of said tubular insert.

14. The valve of claim 9 wherein said tubular insert includes a cylindrical portion.

15. The valve of claim 10 wherein said support structure increases in thickness at both increasing radius and toward a second end of said tubular insert in order to provide the support structure with maximum strength while minimizing impedance to fluid flow through said tubular insert.

16. The valve of claim 9 wherein said means for preventing localization of compression forces at peripheral regions of said disks comprise means for localizing fluid compression forces to central regions of said disks.

17. The valve of claim 16 wherein said means for localizing comprise a planar raised central face portion formed on at least one of said upstream face of said downstream disk and said downstream face of said upstream disk.

18. The valve of claim 17 wherein the area of said planar raised central portion is sufficient to bound the cross-sectional area of the fluid passageways in said upstream and said downstream disks.

19. A valve including the combination of:
a valve body having an internal cavity with an inlet and outlet for fluid;
an upstream disk rotatably supported in the cavity of said valve body and having a fluid passageway for conducting fluid;
means for rotating said upstream disk;
a downstream disk having an upstream face arranged in a face-to-face and confronting relation with a downstream face of said upstream disk in the cavity of said valve body, said downstream disk having a fluid passageway for conducting fluid from the fluid passageway in said upstream disk, at least one of said upstream face of said downstream disk and said downstream face of upstream disk including a raised central region;
a tubular insert supported in said valve body and having a fluid passageway, said tubular insert being interlocked at a first end thereof with said downstream disk and serving to conduct fluid from the fluid passageway in the downstream disk to said outlet, said tubular insert further having a frusto-conical interior wall tapering radially inwardly from said first end of said tubular insert toward a second end thereof;
support means spanning the fluid passageway of said tubular insert, said support means contacting and supporting a downstream face of said downstream disk; and
means for interlocking said tubular insert with said valve body.

20. A valve including the combination of:
a valve body having an internal cavity with an inlet and outlet for fluid;
an upstream disk rotatably supported in the cavity of said valve body and having a fluid passageway for conducting fluid;
means for rotating said upstream disk;
a downstream disk arranged in a face-to-face and confronting relation with said upstream disk in the cavity of said valve body, said downstream disk having a fluid passageway for conducting fluid from the fluid passageway in said upstream disk;
a tubular insert supported in said valve body and having a fluid passageway, said tubular insert being interlocked at a first end thereof with said downstream disk and serving to conduct fluid from the fluid passageway in the downstream disk to said outlet, said tubular insert further having a frusto-conical interior wall tapering radially inwardly from said first end of said tubular insert toward a second end thereof;
support means spanning the fluid passageway of said tubular insert, said support means contacting and supporting a downstream fact of said downstream disk said support means provides support for interior regions of the downstream face of the downstream disk to reduce localized concentrations of forces at peripheral regions of the downstream disk and thereby reduced a torque required to rotate the upstream disk relative to the downstream disk; and
means for interlocking said tubular insert with said valve body.

21. The valve of claim 20 wherein said tubular insert is a cast one-piece member and said support means is cast integrally therewith.

22. The valve of claim 20 wherein said support means includes a raised portion formed thereon for contacting a central portion of said downstream face of said downstream disk, said raised portion protruding outwardly from said first end of said tubular member.

23. The valve of claim 20 wherein said raised portion is circular.

24. The valve of claim 20 wherein said interior wall tapers at an angle of 15° relative to a cylindrical outer wall of said tubular insert.

25. The valve of claim 20 wherein said support means spans said tubular insert at a location substantially at said first end of said tubular insert.

26. The valve of claim 20 wherein said tubular insert includes a cylindrical portion.

* * * * *